Figure 1:
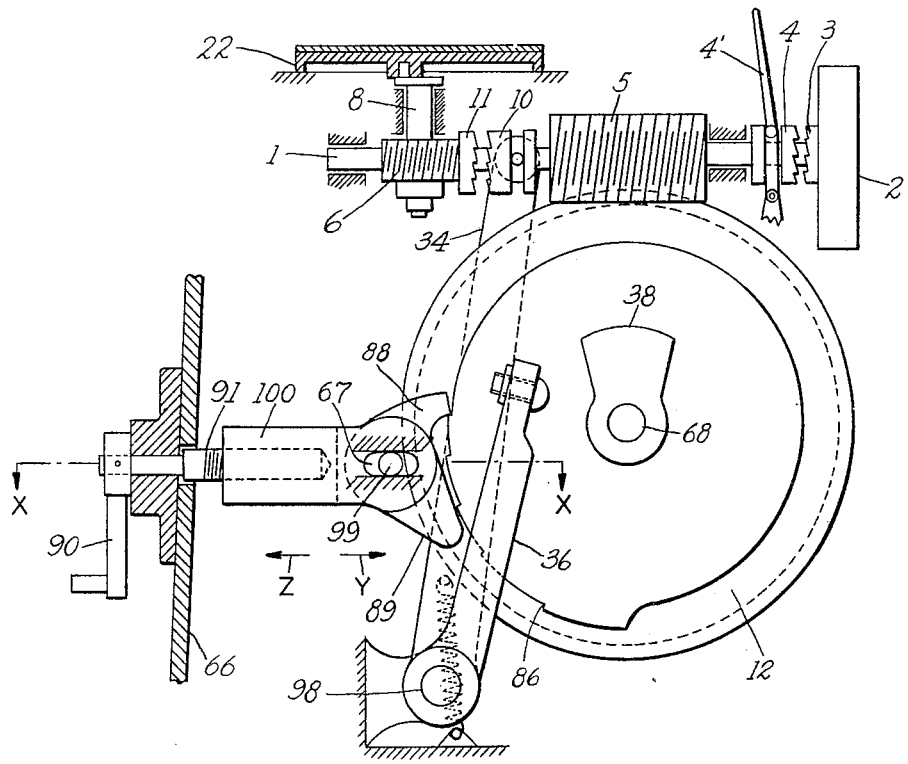

June 26, 1934.　　　　G. RAUSCH　　　　1,964,081

INTERMITTENT DRIVE MECHANISM

Original Filed Dec. 22, 1931

INVENTOR
Gottfried Rausch
BY Sydney J. Prescott
ATTORNEY

Patented June 26, 1934

1,964,081

UNITED STATES PATENT OFFICE 1,964,081

INTERMITTENT DRIVE MECHANISM

Gottfried Rausch, Ammendorf, near Halle-on-the-Saale, Germany

Application December 22, 1931, Serial No. 582,537.
Renewed December 28, 1933. In Germany December 22, 1930

1 Claim. (Cl. 192—139)

The present invention relates to an improvement in the kneading clutch mechanism, particularly for automatic cutting, dough dividing and kneading machines, and primarily to machines of this character as set out in my co-pending application Serial No. 391,454 filed Sept. 9, 1929, on which Patent No. 1,851,328 was granted March 29, 1932.

The object of the present invention is not only to simplify the engagement and disengagement of the kneading clutch, but also to obtain a more convenient possibility of variation as regards the number of kneading revolutions during one operation. The mechanisms of this character previously proposed are very complicated and, therefore, expensive, and are very sensitive in operation. In so far as they enable the gearing to be adjusted to a different number of kneading revolutions it is extremely inconvenient to effect such variations. They can only be effected, whilst the machine is stationary and require separate auxiliary means and tools. The operation is rendered more difficult by reason of the poor accessibility, particularly the arrangement of the adjusting parts in the interior of the machine for the purpose of changing the clutch mechanism to other kneading revolutions.

According to the present invention these defects are completely eliminated by substantial simplification of the construction and operation of the mechanism. This is primarily obtained in that an impact track, cam track or the like gradually approaches a co-operating member adjustable relatively thereto and actuating the kneading clutch. In this manner only one portion of the cam track or the like effects the operation so that according to the number of kneading revolutions required another portion of the cam produces the operation. The track of the operating cams may be arranged constant or in steps. The path of the cam in steps has the advantage that the disengagement of a rotary machine part is only possible at previously determined very definite numbers of kneading revolutions or at definite positions of the driving crank, which are particularly suitable for other purposes of the automatic drive, for example for the return of the rotary part into its initial position.

A further feature of the invenion resides therein that between the driving and driven parts of the clutch members there is provided an adjustable member, for example a lever, which changes its position in the link mechanism relatively to the cam track, the operating lever, or both. In this manner there is obviated the disadvantage of mounting the adjustable stop or stops on parts which move relatively to the machine casing. If, however, the adjustable member is placed between the driving and driven parts it is only necessary to adjust it in the desired manner relatively to the machine casing. It thus becomes easily possible to conveniently vary the number of kneading movements within wide limits in spite of a short adjusting movement.

A further simplification in the actuation of the mechanism for varying the number of kneading operations is obtained in accordance with the invention in that the operating handle, by the operation of which this change-over can be effected at any time, is arranged on the machine frame in a position which is conveniently accessible from the outside.

Figure 2:
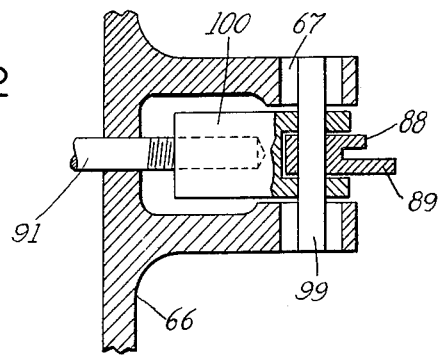

One of the numerous possible forms of construction of the subject of the invention is illustrated diagrammatically in the accompanying drawing, wherein:

Figure 1 shows the clutch mechanism and the parts associated therewith, seen from the side, and Figure 2 shows a partial section on the line x—x of Figure 1.

In the example illustrated the main worm drive 5, 12 is rotated by the driving pulley 2, mounted on the main shaft 1, through the medium of the clutch 3, 4 actuated by the operating lever 4', whilst the clutch 10, 11 connects the shaft 1 and the worm 6 for the kneading crank shafts 8, imparting a rotary movement to the dough supporting plate 22.

On the shaft 68 of the worm wheel 12, or on the wheel itself, there is provided a cam piece 38 adapted to strike the operating lever 36 carried on shaft 98 once during every revolution of the shaft 68, and rock the shaft 98 and spring tensioned clutch lever 34 fixed thereon in a counter-clockwise direction, thereby moving the clutch member 10 into engagement with the clutch member 11 to drive the worm and thus rotate the dough supporting table or plate 22.

When the dough supporting table or plate 22 has carried out the desired number of kneading movements one of the steps of a track formed on the periphery of the cam 86 comes into engagement with the arm 88 of a double armed lever 88, 89, rotatably mounted on the shaft 99. Thereupon the arm 88 is swung outwardly by its engagement with said step of the rotating cam 86 to bring the arm 89 into engagement with the lever 36 and presses this and by means of the clutch lever 34 also the clutch member 10 to the right thus disengaging the clutch. If now the spindle 91 threaded into the sleeve 100 carrying the shaft 99 is rotated in a clockwise or counter-clockwise direction by means of the crank 90, the shaft 99 is moved in the direction of the arrow $y$ or the direction of the arrow $z$ so that it is approached towards or moved away from the cam, another step of the cam track comes into engagement with the lever arm 88 which is thus caused to rock earlier or later than during the first adjustment of the said arm 88 and thus releases the kneading clutch. Consequently the shafts 8 have made a smaller or greater number of kneading revolutions.

The shaft 99 may preferably be provided with a fine adjustment in that this shaft, which is guided in a slot 67 of the machine casing 66 in the direction of the arrows $y$, $z$, is mounted in a screwed sleeve 100 with which engages a screwed spindle 91 which can be rotated by means of a crank 90 which is conveniently accessible outside the machine frame 66.

The invention is not limited to the example of construction hereinbefore described in detail, but also includes all possible modifications thereof.

I claim:—

In a clutch mechanism for dough dividing and kneading machines, the combination with a drive shaft rotating at constant speed, of an automatically operated clutch, an operating lever connected to said clutch, a cam piece driven from said drive shaft only for actuating said operating lever to engage said clutch, and automatic means for actuating said operating lever to disengage said clutch, said means being adjustable to permit variation of the period during which said clutch is engaged, and including a cam driven from said drive shaft only and provided with a plurality of steps extending different distances from its periphery, a double armed lever having one of its arms arranged to engage a step on said cam to swing its other arm against said operating lever to disengage said clutch, and means for adjusting the fulcrum of said lever toward or away from said cam to cause it to be swung against said operating lever by different steps of said cam.

GOTTFRIED RAUSCH.